C. D. PETTIS.
BRAKE SHOE.
APPLICATION FILED JULY 21, 1913.
1,100,093.
Patented June 16, 1914.
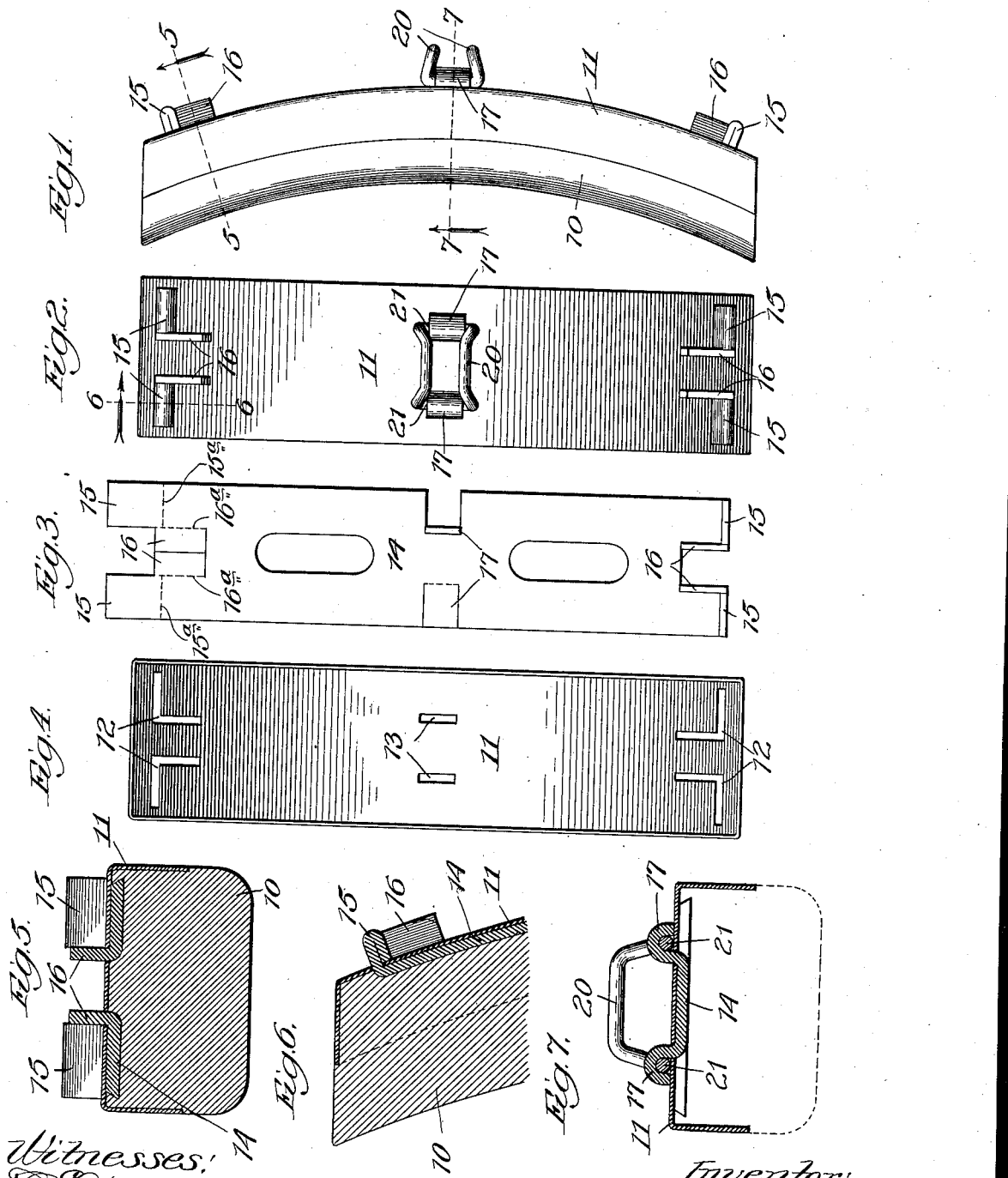

UNITED STATES PATENT OFFICE.

CLIFTON D. PETTIS, OF RIDGEWOOD, NEW JERSEY.

BRAKE-SHOE.

1,100,093.  Specification of Letters Patent.  Patented June 16, 1914.

Application filed July 21, 1913. Serial No. 780,313.

*To all whom it may concern:*

Be it known that I, CLIFTON D. PETTIS, a citizen of the United States, and a resident of Ridgewood, county of Bergen, State of New Jersey, have invented certain new and useful Improvements in Brake-Shoes, of which I do declare the following to be a full, clear, and exact description.

This invention has relation to brake shoes of that type in which provision is made for reinforcing the backs of the shoes and the invention consists in the features of novelty hereinafter described, illustrated in the accompanying drawings and particularly pointed out in the claims at the end of this specification.

Examples of the type of brake shoes to which my invention more particularly relates are shown in various Letters Patent of the United States, granted to me under date of June 24, 1913, and numbered 1,065,718; 1,065,719 and 1,065,721.

In the accompanying drawings, Figure 1 is a view in side elevation of a brake shoe embodying my invention. Fig. 2 is a plan view of the shoe. Fig. 3 is a view of the blank from which the supplemental back plate is formed, portions of this blank being bent to shape and portions being shown unbent. Fig. 4 is an inverted plan view of a pan shaped back or shell which is preferably employed as part of my improved shoe. Fig. 5 is a view in cross-section on line 5—5 of Fig. 1. Fig. 6 is a view in longitudinal section on line 6—6 of Fig. 2. Fig. 7 is a view in cross-section on line 7—7 of Fig. 1.

The body 10 of my improved brake shoe is preferably formed of cast metal, although any other suitable wearing material may be employed, if desired. The upper portion of the body 10 of the brake shoe is inclosed by the pan shaped back or shell 11 that is preferably formed from a thin sheet of ductile metal. This pan shaped back or shell 11 is provided adjacent its ends with the angular slots 12 and adjacent its center with the slots 13. Within the pan shaped back or shell 11 (if the same be used) is placed a reinforcing member or supplemental back plate 14. This reinforcing member 14 is formed from a plate of ductile metal somewhat thicker than the plate of which the shell 11 is formed, and this reinforcing member or supplemental back plate 14 extends approximately from end to end of the shoe.

In Fig. 3 of the drawings I have shown a blank from which the back plate 14 is formed. This blank is first cut to form the tongues or flanges 15 and 16 at the ends of the back plate 14 and to form the tongues or flanges 17 adjacent the center of the back plate. The tongues or flanges 16 are bent upwardly along the lines 16ᵃ, as shown at the upper end of Fig. 3 of the drawing. The tongues or flanges 15 are bent upwardly upon the lines 15ᵃ and the tongues or flanges 17 are bent upwardly at substantially right angles to the back plate 14, as shown. When the several tongues or flanges 15, 16 and 17 have been bent to approximately right angles to the back plate 14, the tongues or flanges 15 and 16 will be passed through the angular slots 12 adjacent the ends of the pan 11 and the tongues or flanges 17 will be passed through the slots 13 at the center of the pan or shell 11, after which the upper portions of the tongues or flanges 15 will be bent downwardly, so as to give a double thickness to the side portions of the end lugs, as clearly shown in Figs. 1, 2 and 6 of the drawings. By this means, also, the back plate 14 is securely interlocked with the shell or back 11. After the tongues or flanges 17 have been bent to approximately right angles with respect to the back plate 14 and have been passed through the slots 13 of the shell 11, the center lug will be next secured in position. This center lug consists preferably of a wire bent to form the inverted U-shaped portions 20, the ends of these U-shaped portions being connected by the cross-bars 21. In order to attach the center lug, the cross-bars 21 will be set outside the upstanding prongs or flanges 17, after which the free ends of these prongs or flanges will be bent laterally and inwardly around the end bars 21 of the center lug, so as to securely hold the center lug in position, as clearly shown in Fig. 7 of the drawing.

After the parts have been assembled in manner above described, the shell will be placed within the mold and the body 10 of the shoe will be attached thereto in the casting operation. While in the preferred form of my invention, the pan shaped back or shell 11 is used, it is manifest that features of the invention may be employed, even if the back or shell 11 be omitted; and the precise details above set out may be varied without departing from the spirit of the invention.

Having thus described my invention, what

I claim as new and desire to secure by Letters Patent is—

1. A brake shoe comprising a body, a ductile metal reinforcing member provided at each of its ends with two longitudinally projecting tongues or prongs bent outward transversely of said member and two tongues or prongs bent outward longitudinally of said member, said several tongues or prongs forming the end lugs of the shoe.

2. A brake shoe comprising a body, a ductile metal reinforcing member provided at each of its ends with longitudinal tongues or prongs bent transversely of said member and folded upon themselves, and two tongues or prongs bent outward longitudinally of said member, said several tongues or prongs forming the end lugs of the shoe.

3. A brake shoe comprising a body, a ductile metal reinforcing member provided adjacent its center with tongues or prongs integral with said member, and a center lug having at its sides bars extending longitudinally of said member and across said tongues or prongs, said tongues or prongs being bent upwardly and laterally to interlock with said bars of the center lug.

4. A brake shoe comprising a body, a ductile metal reinforcing member provided adjacent its center with tongues or prongs integral with said member, a center lug formed of inverted U-shaped bars and connecting cross bars, said tongues or prongs being bent to interlock with said cross bars of the center lug.

5. A brake shoe comprising a body, a ductile metal back having longitudinal and transverse slots at its ends, and a reinforcing member located within said back and provided at each end with tongues or prongs projecting outwardly through the slots of said back and forming end lugs for the shoe.

6. A brake shoe comprising a ductile metal back having longitudinal slots adjacent its center and a ductile metal reinforcing member provided adjacent the center with two projecting tongues or prongs bent outwardly and passing through said back, and a center lug interlocked with said tongues or prongs.

7. A brake shoe comprising a body, a ductile metal reinforcing member provided adjacent its center with tongues or prongs integral with said member and extending upwardly above the plane thereof, and a center lug having its lower ends interlocked with said upwardly-extending tongues or prongs.

CLIFTON D. PETTIS.

Witnesses:
 GEO. P. FISHER,
 J. G. ANDERSON.

Copies of this patent may be obtained for five cents each, by addressing the "Commissioner of Patents, Washington, D. C."